(12) United States Patent
Choi

(10) Patent No.: US 9,477,367 B2
(45) Date of Patent: Oct. 25, 2016

(54) METHOD OF MANUFACTURING TOUCH PANEL, TOUCH PANEL, AND ELECTRONIC DEVICE

(71) Applicant: Samsung Electronics Co., Ltd., Suwon-si, Gyeonggi-do (KR)

(72) Inventor: Jong-Mun Choi, Yangsan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 3 days.

(21) Appl. No.: 14/458,668

(22) Filed: Aug. 13, 2014

(65) Prior Publication Data

US 2015/0062035 A1 Mar. 5, 2015

(30) Foreign Application Priority Data

Aug. 30, 2013 (KR) .................. 10-2013-0104068

(51) Int. Cl.
*G06F 3/047* (2006.01)
*G06F 3/041* (2006.01)
*G06F 3/044* (2006.01)

(52) U.S. Cl.
CPC .............. *G06F 3/047* (2013.01); *G06F 3/044* (2013.01); *G06F 3/0412* (2013.01); *G06F 2203/04103* (2013.01); *G06F 2203/04111* (2013.01)

(58) Field of Classification Search
CPC combination set(s) only.
See application file for complete search history.

(56) References Cited

U.S. PATENT DOCUMENTS

| 2011/0109591 | A1* | 5/2011 | Kurokawa | .......... G02F 1/13338 345/175 |
| 2011/0109592 | A1* | 5/2011 | Kurokawa | ............ G06F 3/0412 345/175 |
| 2011/0316803 | A1 | 12/2011 | Kim | |
| 2012/0318585 | A1 | 12/2012 | Kim et al. | |

FOREIGN PATENT DOCUMENTS

| KR | 10-1096559 B1 | 12/2011 |
| KR | 10-2012-0001406 A | 1/2012 |
| KR | 10-2012-0138287 A | 12/2012 |
| KR | 10-2013-0035509 A | 4/2013 |

* cited by examiner

Primary Examiner — Van Chow
(74) Attorney, Agent, or Firm — Jefferson IP Law, LLP

(57) ABSTRACT

A touch panel is provided. The touch panel includes a window, a sensor layer formed on a visible area of the window and comprising sensor patterns for detecting an input, a light shielding layer formed on a non-visible area of the window located around the sensor layer, wiring electrodes formed on the light shielding layer and connected to the sensor patterns such that the sensor layer is connected to an external connector, and etching masks formed on the wiring electrodes, respectively.

9 Claims, 18 Drawing Sheets

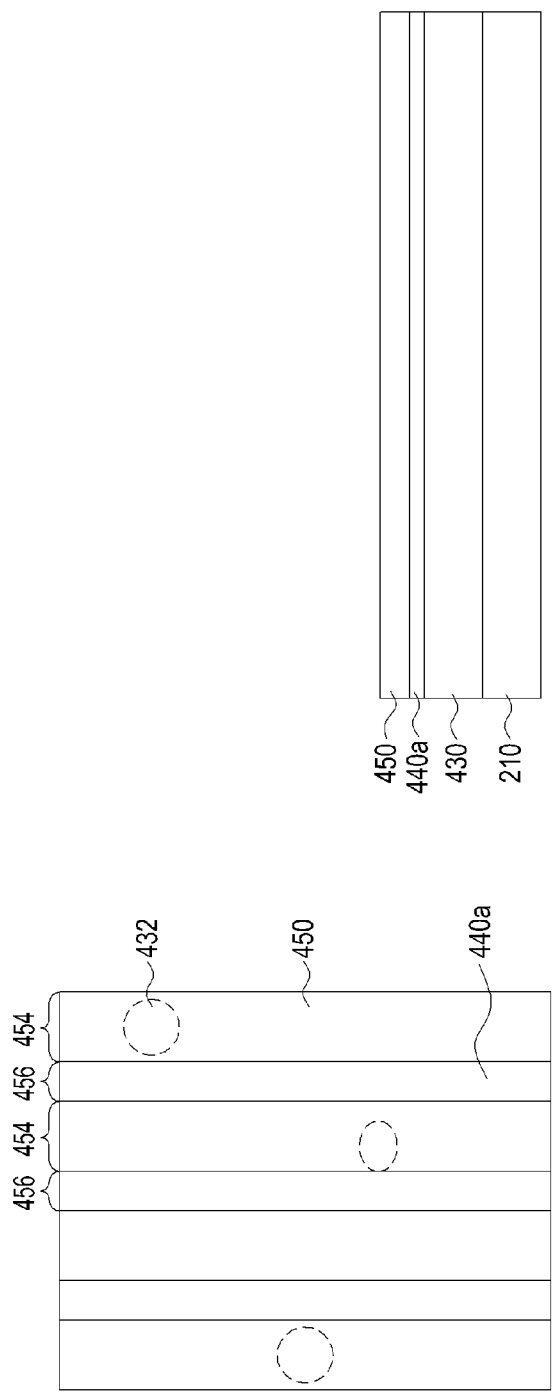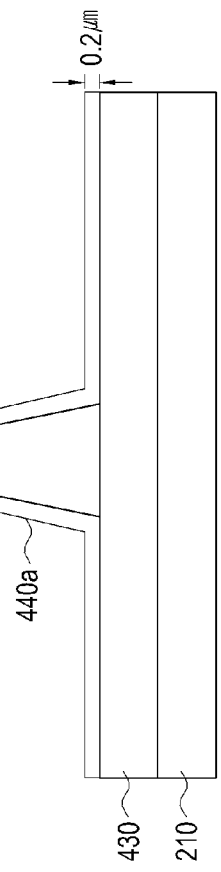

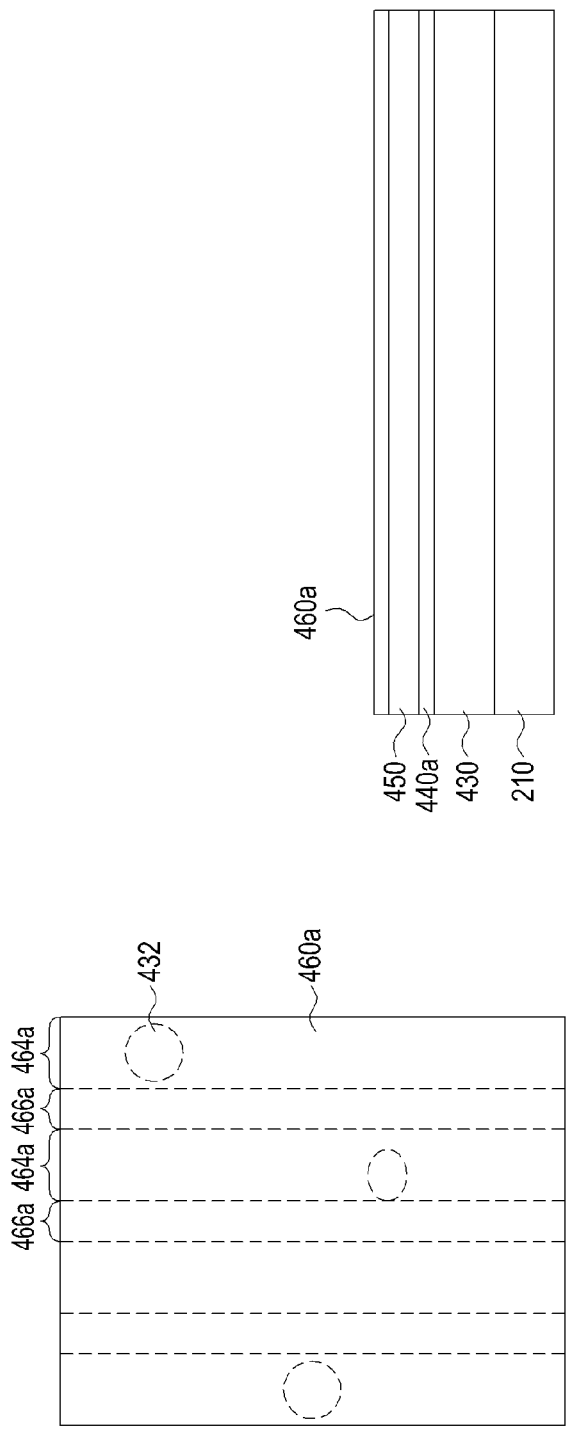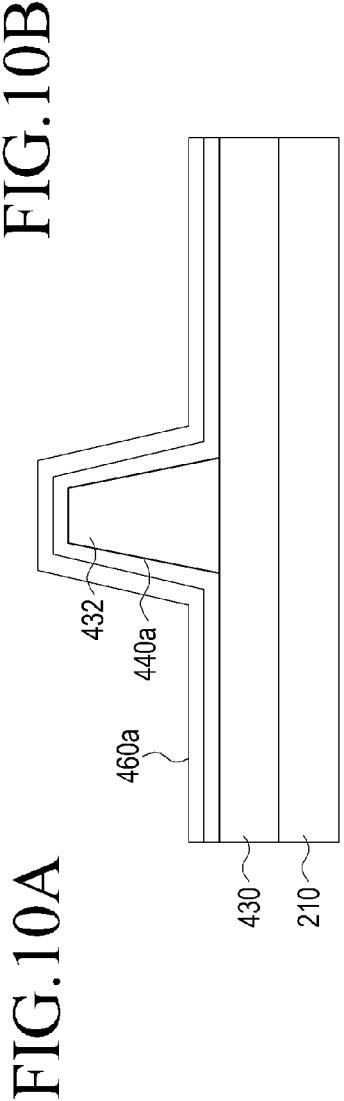

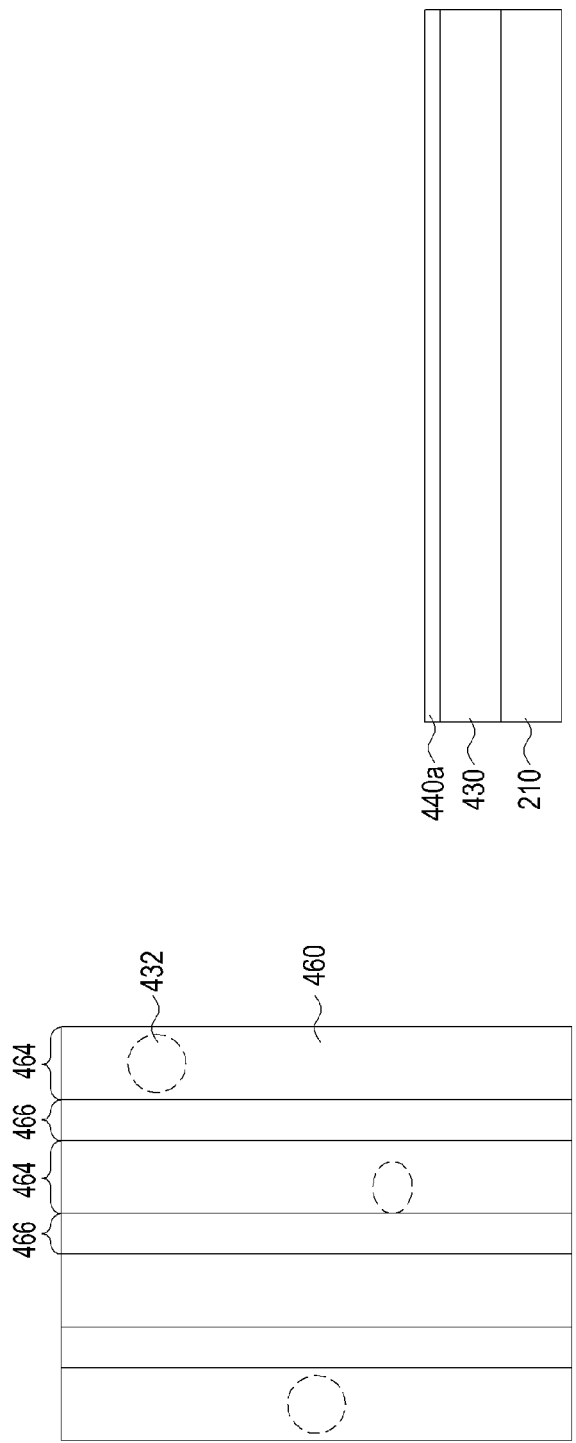
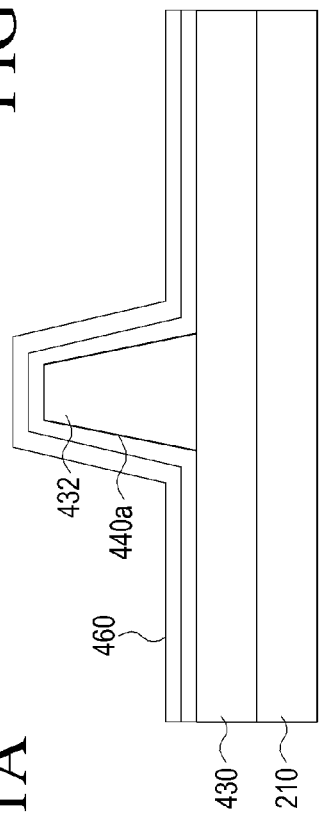
FIG.11A
FIG.11B
FIG.11C

METHOD OF MANUFACTURING TOUCH PANEL, TOUCH PANEL, AND ELECTRONIC DEVICE

CROSS-REFERENCE TO RELATED APPLICATION(S)

This application claims the benefit under 35 U.S.C. §119 (a) of a Korean patent application filed on Aug. 30, 2013 in the Korean Intellectual Property Office and assigned Serial number 10-2013-0104068, the entire disclosure of which is hereby incorporated by reference.

TECHNICAL FIELD

The present disclosure relates to a touch panel. More particularly, the present disclosure relates to a method of manufacturing a touch panel, a touch panel manufactured by using the same, and an electronic device.

BACKGROUND

A touch panel is an input unit for detecting a location of a finger of a user or a tool when the finger or the tool contacts it. Touch panels are classified into a resistive type, a capacitive type, an InfraRed (IR) type, a Surface Acoustic Wave (SAW) type, an ElectroMagnetic (EM) type, and an ElectroMagnetic Resonance (EMR) type according to their operating and detecting principles.

A touch panel generally includes a sensor layer for detecting a contact of an input source (for example, a finger and a stylus pen) and is connected to a control unit through wiring electrodes. The control unit detects contact by the input unit and determines a location of the contacted portion of the touch panel.

In a process of forming a wiring electrode on a light shielding layer, the wiring electrode is partially or entirely unformed due to a defect in the light shielding layer. Accordingly, a line resistance of the wiring electrode may increase and the wiring electrode may be open-circuited and transmission of a signal applied to the sensor layer or output from the sensor layer may be delayed or lost, thereby adversely influencing touch sensitivity and operation speed. Further, due to a defect in the light shielding layer, it is difficult to form a fine wiring electrode on the light shielding layer.

The light shielding part may be manufactured through a Black Matrix (BM) method and a printing method. The light shielding part manufactured through the BM method provides a very flat and uniform surface and has no open circuit related errors in wiring, but a color realized through the BM method is limited to black. The printing method can realize various colors since ink is used, but wiring having a uniform surface may not be easily manufactured since a surface formed by the printing method is rough and many boss defects exist on the surface.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of manufacturing a touch panel, a touch panel manufactured by using the same, and an electronic device.

In accordance with an aspect of the present disclosure, a touch panel is provided. The touch panel includes a window, a sensor layer formed on a visible area of the window and comprising sensor patterns for detecting an input, a light shielding layer formed on a non-visible area of the window located around the sensor layer, wiring electrodes formed on the light shielding layer and connected to the sensor patterns such that the sensor layer is connected to an external connector, and etching masks formed on the wiring electrodes, respectively.

In accordance with another aspect of the present disclosure, an electronic device having a touch panel is provided. The touch panel includes a window, a sensor layer formed on a visible area of the window and comprising sensor patterns for detecting an input, a light shielding layer formed in a non-visible area of the window located around the sensor layer, wiring electrodes formed on the light shielding layer and connected to the sensor patterns such that the sensor layer is connected to an external connector, and etching masks formed on the wiring electrodes, respectively.

In accordance with yet another aspect of the present disclosure, a method of manufacturing a touch panel is provided. The method includes forming a light shielding layer on a non-visible area of a window, forming a conductive layer on the light shielding layer, forming photoresistive masks on the conductive layer to have patterns corresponding to gap patterns of wiring electrodes, forming an insulation layer on the photoresistive masks and portions of conductive layers between the photoresistive masks, removing the photoresistive masks and portions of the insulation layer on the photoresistive masks and forming etching masks corresponding to the remaining portions of the insulation layer between the photoresistive masks, and etching a portion of the conductive layer using the etching masks and forming wiring electrodes corresponding to the remaining portion of the conductive layer.

According to the present disclosure, various colors may be realized in the optical shielding part, a thin printing type bezel having a high design quality can be provided, a process sequence having a minimum number of steps can be provided such that a touch panel can be competitive in product prices in the market, and the yield rate can be improved and stably secured by covering a printing defect of the light shielding layer.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 4A, 4B, 5A, 5B, 6A and 6B are views for explaining a method of manufacturing a wire of a touch panel according to;

FIGS. 8A, 8B, 9A, 9B, 9C, 10A, 10B, 10C, 11A, 11B, 11C, 12A, and 12B are views for explaining a method of manufacturing a wire of a touch panel according to an embodiment of the present disclosure;

Throughout the drawings, it should be noted that like reference numbers are used to depict the same or similar elements, features, and structures.

DETAILED DESCRIPTION

Figure 1:
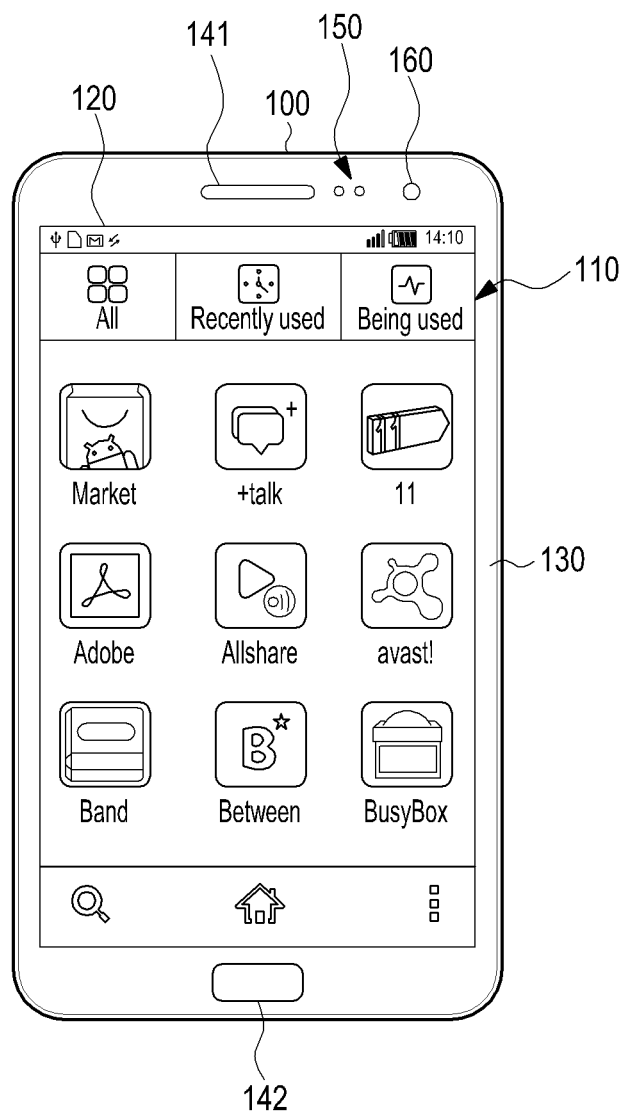
FIG. 1 shows an external appearance of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms including ordinal numerals such as "first", "second", and the like can be used to describe various structural elements, but the structural elements are not limited by these terms. The terms are used only to distinguish one structural element from another structural element. For example, without departing from the scope of the present disclosure, a first structural element may be named a second structural named. Similarly, the second structural element also may be named the first structural element. The terms "and/or" includes combinations of a plurality of related items or a certain item among the plurality of related items.

Relative terms described with reference to those viewed from the drawings such as a front surface, a rear surface, an upper surface, and a lower surface may be replaced by ordinal numbers such as first and second. In the ordinal numbers such as first and second, their order are determined in the mentioned sequence or arbitrarily and may be arbitrarily changed if necessary.

The terms used in this application are for the purpose of describing particular embodiments only and are not intended to limit the disclosure. As used herein, the singular forms are intended to include the plural forms as well, unless the context clearly indicates otherwise. In the description, it should be understood that the terms "include" or "have" indicate existences of a feature, a number, a step, an operation, a structural element, parts, or a combination thereof, and do not previously exclude the existences or probability of addition of one or more another features, numerals, steps, operations, structural elements, parts, or combinations thereof.

Unless defined differently, all terms used herein, which include technical terminologies or scientific terminologies, have the same meaning as a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present specification.

In the present disclosure, the electronic device may be any device that includes a touch panel, and may be referred to as a terminal, a portable terminal, a mobile terminal, a communication terminal, a portable communication terminal, a portable mobile terminal, or a display device.

For example, the electronic device may be a smartphone, a portable phone, a game player, a TeleVision (TV), a navigation device, a heads-up display unit for a vehicle, a notebook computer, a laptop computer, a tablet Personal Computer (PC), a Personal Media Player (PMP), a Personal Digital Assistants (PDA), or the like. The electronic device may be implemented as a portable communication terminal which has a wireless communication function and is pocket-sized. Further, the electronic device may be a flexible device or a flexible display unit.

The electronic device may communicate with an external electronic device such as a server or may perform an operation through association with the external electronic device. For example, the electronic device may transmit an image photographed by a camera and/or location information detected by a sensor unit to a server through a network. The network may be a mobile or cellular communication network, a Local Area Network (LAN), a Wireless Local Area Network (WLAN), a Wide Area Network (WAN), the Internet, or a Small Area Network (SAN), but is not limited thereto.

FIG. 1 shows an external appearance of an electronic device according to an embodiment of the present disclosure.

The electronic device 100 includes a touch screen panel 120, and may further include at least one of an input/output module, a storage unit, a sensor unit 150, a camera module 160, a communication unit, and a control unit.

The input/output module is a unit for receiving an input of the user or informing the user of information. The input/output module may include a speaker 141 and a button 142, and may further include a microphone, a vibration motor, a connector, a keypad, a mouse, a trackball, a joystick, cursor direction keys, or a cursor control.

The storage unit may store data for a voice recognition application, a schedule management application, a document writing application, a music application, an Internet application, a map application, a camera application, an e-mail application, an image edition application, a search application, a file search application, a video application, a game application, a Social Network Service (SNS) application, a phone application, and/or a message application. The storage unit may store images for providing a Graphical User Interface (GUI) related at least one application, data or a database of user information, documents and/or the like, background images (a menu screen, a standby screen and/or the like) or operation programs necessary for operating the electronic device 100, and/or images photographed by a camera. The storage unit 120 is a machine (for example, a computer)-readable medium that provides data to the machine to perform a predetermined function. The machine-readable medium may be a storage medium. The storage unit may include non-volatile media or volatile media. These media types should be a type that allows the commands transferred by the media to be detected by a physical instrument through which the machine reads the commands.

The computer readable storage medium includes, but is not limited to, at least one of a floppy disk, a flexible disk, a hard disk, a magnetic tape, a Compact Disc Read-Only Memory (CD-ROM), an optical disk, a punch card, a paper tape, a Random Access Memory (RAM), a PROM, an Erasable PROM (EPROM), and a Flash-EPROM.

The sensor unit 150 may include one or a plurality of sensors that detects a state (a position, a point of compass, a movement, and/or the like) of the electronic device 100. For example, the sensor unit 150 may include a proximity sensor that detects whether a user approaches the electronic device 100, a motion/point of compass sensor that detects a motion of the electronic device 100 (for example, rotation, acceleration, deceleration, vibration and the like of the electronic device 100), or the like. The motion/point of compass sensor may include an acceleration sensor (or a gravity sensor) for measuring an inclination and detecting a change in a linear speed, a gyro sensor for detecting an angular speed, an impact sensor, a GPS sensor, a compass sensor (or a terrestrial magnetism sensor) for detecting a point of compass, or an inertia sensor for detecting an inertial force of a motion and providing various information such as an acceleration, a speed, a direction, and a distance of a moving object that is a measurement target. The sensor unit 150 may detect a state of the electronic device 100, and may generate a signal corresponding to the detection result to transmit the signal to a control unit. For example, the GPS sensor may receive radio waves from a plurality of GPS satellites (not illustrated) in orbit and calculate a GPS position of the electronic device 100 using a time of arrival of the radio waves from the GPS satellites (not illustrated). The compass sensor may calculate a position or a point of compass of the electronic device 100.

The camera 160 may include a lens system, a driving unit, and an image sensor, and may further include a flash. The camera 160 may receive an optical signal input into (or photographed by) the lens system, convert the optical signal into an electrical image signal or data, and output the signal or data. The user may photograph a video or a still image through the camera 160. That is, the camera 160 may receive an optical image of a subject and convert the optical image into an electrical signal.

The communication unit is provided for direct connection with a server or an external electronic device or connection with the server or the external electronic device through a network and may be a wired or wireless communication unit. The communication unit transmits data from the control unit, the storage unit, or the camera 160 via a wired or a wireless connection. The communication unit also receives data from a wired or wireless connection and transmits the received data to the control unit or store the data in the storage unit.

The communication unit may include a mobile communication module, a wireless LAN module, or a near field communication module. The communication unit may include an Integrated Services Digital Network (ISDN) card, a modulator/demodulator (modem), a Near Field Communication (NFC) network card, an infrared module, a Bluetooth module, a ZigBee module, or a wireless module, but is not limited thereto.

The touch screen panel 120 displays an image or data input from the control unit. The touch screen panel 120 may display an image according to control of the control unit and may output user input information (e.g., an input coordinate and an input state) to the control unit if a user input unit is proximate to the surface (for example, a separation between the touch screen panel 120 and the body of the user or the input unit is larger than zero and equal to or less than 5 cm). That is, the touch screen panel 120 may detect an input of the user and output the detected input information to the control unit. The touch screen 120 includes a visible area 110 which may be viewed by the user, and a non-visible area which is hidden by a bezel 130 that partially constitutes the housing of the electronic device 100 so as not to be viewed by the user. For example, the touch screen 120 may output an image in the non-visible area, but since the image displayed in the non-visible area is hidden by the bezel 130, the user cannot view the image.

The control unit controls an overall operation of the electronic device 100 and executes an application according to user input information, which performs a program operation according to the user input information. The user input includes an input through an input/output module, a touch screen panel 120, and a sensor unit 150, or an input based on a camera 160. The control unit may include a bus for communications between various components and a processor for processing data. The control unit may include a Central Processing Unit (CPU), an Application Processor (AP) or a Communication Processor (CP).

The control unit may further include a RAM connected to the bus to temporarily store information required by the processor and a Read Only Memory (ROM) connected to the bus to store static information required by the processor.

Figure 2:
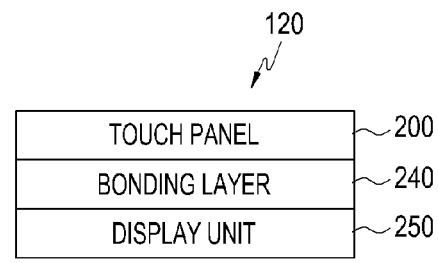
FIG. 2 shows a touch screen panel according to an embodiment of the present disclosure.

FIG. 2 shows a touch screen panel according to an embodiment of the present disclosure.

The touch screen panel 120 includes a touch panel 200, and may further include a display unit 250 and a bonding layer 240.

The display unit 250 may include a plurality of pixels, and may display an image through the pixels.

A part (central portion) of a front surface of the display unit 250 corresponds to a visible area of the touch screen panel 120 and the display unit 250 may employ a Liquid Crystal Display (LCD), an Organic Light Emitting Diode (OLED), or the like.

The touch panel 200 is attached (that is, bonded) to the display unit 250 by using a bonding layer 240. The bonding layer 240 is formed of an insulating material. The bonding layer 240 may use an Optical Clear Adhesive (OCA) tape, an adhesive (e.g., a glue), or an ultraviolet curing resin. The OCA tape allows double-sided bonding and may be formed of a material such as acryl, silicon, or the like.

The touch panel 200 includes a window, a sensor layer, and a wiring.

The window is located on a surface of the electronic device 100 to which the touch panel 200 is mounted. When the user performs a touch input, the user contacts the front surface of the window.

The sensor layer is formed on a rear surface of the window and detects a user input. That is, if the input unit contacts a front surface of the window, the sensor layer detects a change in a capacitance, a change in a resistance, or a change in a voltage or a current based on the type of sensor and transfers the detected changes to the control unit. The sensor layer is located in a visible area of the touch screen panel 120.

The wiring is formed on a rear surface of the window to be located at an edge of the sensor layer and transfers a signal generated by the sensor layer to the control unit. The wiring is located in the non-visible area of the touch screen panel 120 (or the window or the touch panel 200) and may be connected to the control unit through a Flexible Printed Circuit Board (FPCB). The wiring includes a plurality of wiring electrodes, which are connected to sensor patterns of the sensor layer. The wiring electrode may have a multilayered structure for preventing diffusion (for example, secondary creation of nuclei and creation of alloys) of a main metal layer, and for example, may have a multilayered structure of molybdenum/aluminum/molybdenum. The touch panel 200 is connected to the control unit through a flexible printed circuit board and a connector of the flexible printed circuit board is connected to the wiring electrode.

Figures 3A, 3B:
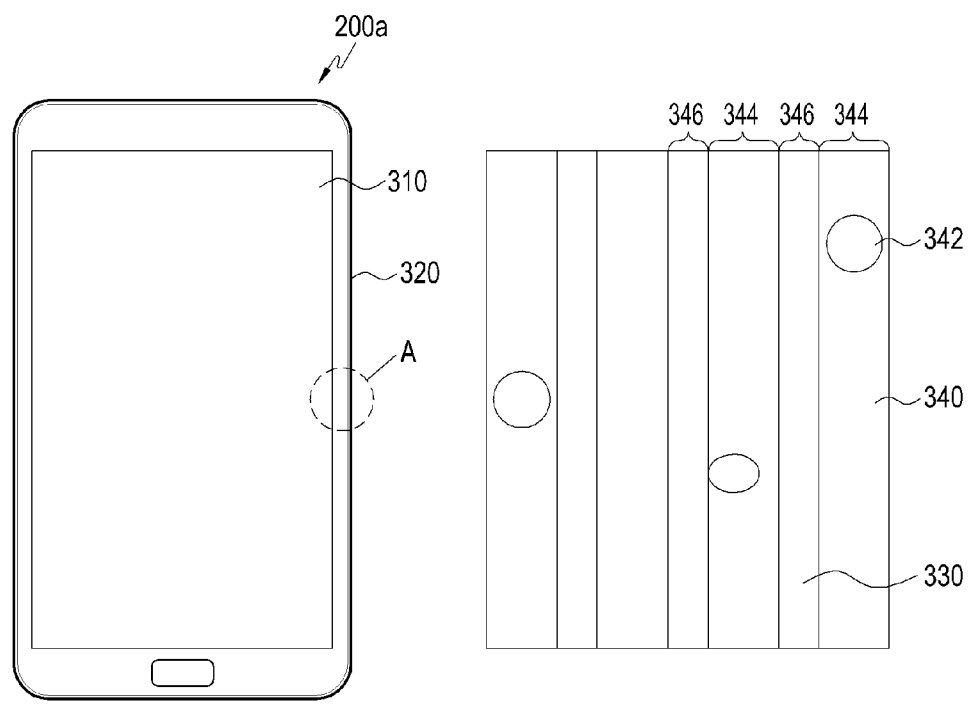
FIGS. 3A and 3B show a touch panel according to an embodiment of the present disclosure.

FIGS. 3A and 3B show a touch panel according to an embodiment of the present disclosure.

Referring to FIG. 3A, a front surface of the touch panel is illustrated. When viewed by the user, a front surface of the touch panel 200a is classified into a visible area 310 located at the center of the touch panel 200a and a non-visible area 320 located at edges of the visible area 310 (that is, a peripheral portion of the touch panel).

A rear surface of part of the non-visible area 320 as shown in FIG. 3B is indicated by a dotted circle A in FIG. 3A. A light shielding layer 330 is formed on a rear surface of the window and a plurality of wiring electrodes 340 spaced apart from each other are formed on a surface of the light shielding layer 330.

The light shielding layer 330 may be formed through a step such as printing. A material of the light shielding layer 330 may be a screen printing ink containing a resin such as PolyEthylene (PE), acryl, or PolyUrethane (PU), and the screen printing ink may further contain a pigment for Color Material Finishing (CMF).

The shown wiring electrode 340 has a defect 342, which is an unintended portion that does not follow a preset pattern or may be an entirely or partially open-circuited portion. The defect 342 is caused when the light shielding layer 330 formed through a printing method has a defect such as foreign substances or bosses.

Reference numeral 344 denotes a wiring area in which a wiring electrode is disposed and reference numeral 346 denotes a non-wiring area in which a wiring electrode is not disposed.

FIGS. 4A to 6B are views for explaining a method of manufacturing a wiring of a touch panel according to an embodiment of the present disclosure.

Figure 4A:
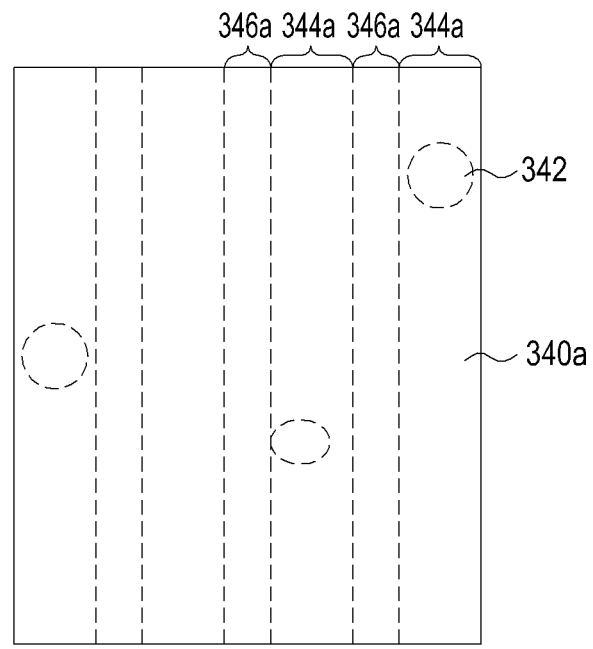
Figure 4B:
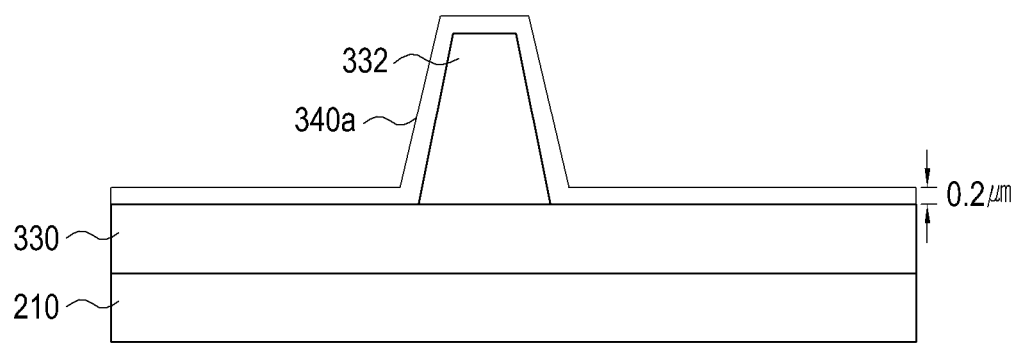

Referring to FIGS. 4A and 4B, FIG. 4A, shows a rear surface of a portion of the non-visible area and FIG. 4B shows a side sectional view of a non-etching planned area.

A light shielding layer 330 is formed on a rear surface of the window 210 and a conductive layer 340a is formed on a surface of the light shielding layer 330. The light shielding layer 330 may have a defect 332. The conductive layer 340a may be formed through a thin film deposition step such as Physical Vapor Deposition (PVD) or Chemical Vapor Deposition (CVD). Examples of PVD may include E-beam evaporation, sputtering, arc ion plating, and pulsed laser deposition. Examples of CVD may include MetalOrganic Chemical Vapor Deposition (MOCVD), Plasma-Enhanced Chemical Vapor Deposition (PECVD), Hydride Vapor Phase Epitaxy (HVPE), Atomic Layer Deposition (ALD), and Plasma Enhanced Atomic Layer Deposition (PEALD).

Reference numeral 344a denotes a non-etching planned area of the conductive layer 340a and reference numeral 346a denotes an etching planned area of the conductive layer 340a. The non-etching planned area 344a is disposed to correspond to a wiring electrode.

Figure 5A:
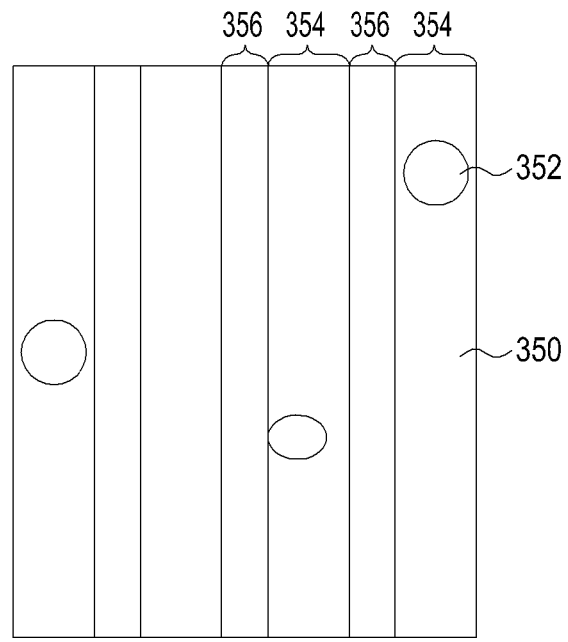
Figure 5B:
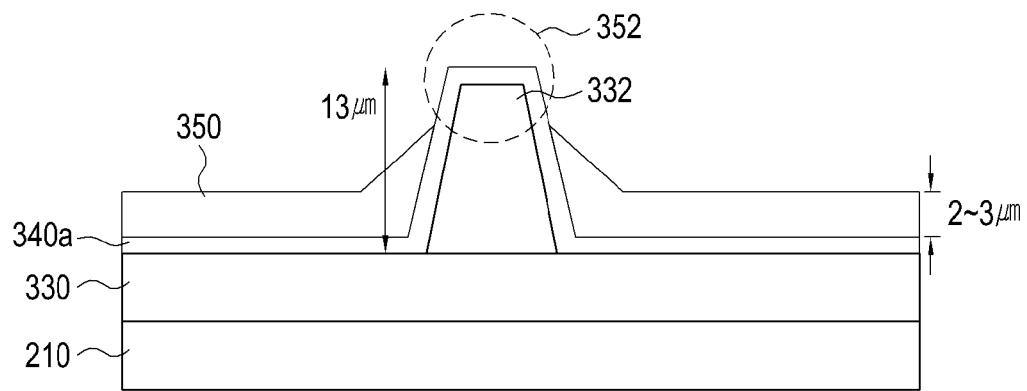

Referring to FIGS. 5A and 5B, FIG. 5A shows a rear surface of a portion of a non-visual area and FIG. 5B shows a side sectional view of a mask area.

A photoresistive mask 350 (or a photoresistive mask layer) is formed on a surface of the conductive layer 340a through a photolithography step. In the photolithography step, the photoresistive mask 350 is formed on a surface of the conductive layer 340a through a photoresist coating step such as spin coating, roll coating, slit coating, or spray coating, an exposure step using an optical mask, and a development step using a developer. A defect 352 is generated in the photoresistive mask 350 due to a defect 332 of the light shielding layer 330. A portion of the conductive layer 340a is exposed to the outside due to the defect 352 of the photoresistive mask 350.

Reference numeral 354 denotes a mask area in which the photoresistive mask 350 is disposed and reference numeral 356 denotes a non-mask area in which the photoresistive mask 350 is not disposed. The photoresistive mask 350 is located to correspond to a wiring electrode.

Figure 6A:
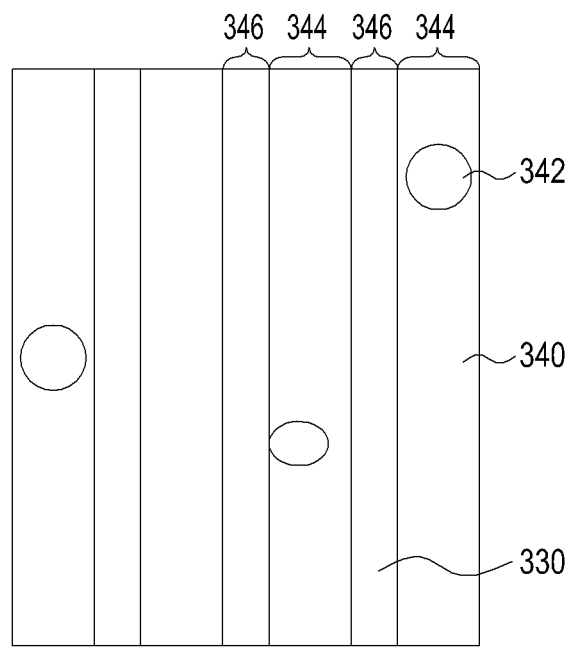
Figure 6B:
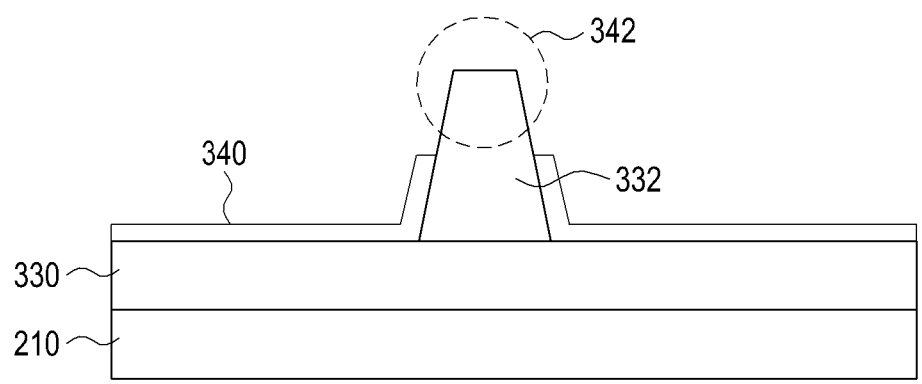

Referring to FIGS. 6A and 6B, FIG. 6A shows a rear surface of a portion of a non-visible area and FIG. 6B shows a side sectional view of a non-etching area.

The conductive layer 340a is etched by using the photoresistive mask 350 and the photoresistive mask 350 is removed by using a stripper. The etched conductive layer corresponds to the wiring electrode 340. Since a portion of the conductive layer 340a is exposed to the outside through the defect of the photoresistive mask 350, the portion of the conductive layer 340a exposed in an etching step using the photoresistive mask 350 is removed. The removed portion of the conductive layer 340a corresponds to the defect 342 of the wiring electrode 340.

The light shielding layer is manufactured through a printing step due to the need to secure design quality (i.e., realization of a color preferred in the market), which frequently causes defects such as printing substances and bosses when the light shielding layer is manufactured through the printing method. The defects cause open-circuiting in wiring that is formed on the light shielding layer. The defects of the light shielding layer act as an obstacle in forming the wiring through photolithography.

As shown in FIGS. 5A and 5B, the defects of the light shielding layer cause un-coating or non-conformal coating of the photoresistive mask, that is, a defect. The un-coating refers to coating having an uneven thickness.

The photolithography step is a method of manufacturing a wiring having the finest structure of the currently known methods and is known as a method by which a non-visible area (i.e., a bezel of an electronic device) of a touch panel can be minimized.

As shown in FIGS. 6A and 6B, a portion of the conductive layer on which a photoresistive mask having an etching preventing function fails to be coated is corroded and removed in the etching step, and finally causes an open circuit in the wiring or a conductive defect in the wiring.

The causes of the defects of the photoresist layer formed through liquid or solution coating include an intrinsic surface tension of a solution and gravity a contraction of a solution that is generated during treatment (e.g., a thermal treatment or drying) in a photolithography step, and a mutual structural relation such as a defect of the light shielding part or a thickness of the photo resist layer. The problems are caused by the intrinsic characteristics of the solution and cannot be solved by improving the general method of the process.

The flatness of a surface of the light shielding part is inferior due to a limit in a process capacity which can be achieved through a printing step. As a result, the photoresist layer coated on a surface of the light shielding part has an uneven thickness distribution and does not have an intended thickness, thereby resulting in problems such as a defect in a line width of a wiring and open-circuits in the wiring.

As described above, a wiring defect due to a defect of the light shielding part such as bosses or foreign substances is mainly caused by un-coating due to a solution coating step.

As a numerical example, a maximum coating thickness of the photoresist layer which can be achieved through a solution coating method for the photoresist layer (e.g., a slit coating or a roll coating) is about 5 μm, and it is difficult to uniformly coat the photoresist layer to cover a defect of the light shielding layer with a currently known method because the thickness of a defect (i.e., foreign substances or bosses) is about 5 μm to 13 μm.

Figures 7A, 7B:
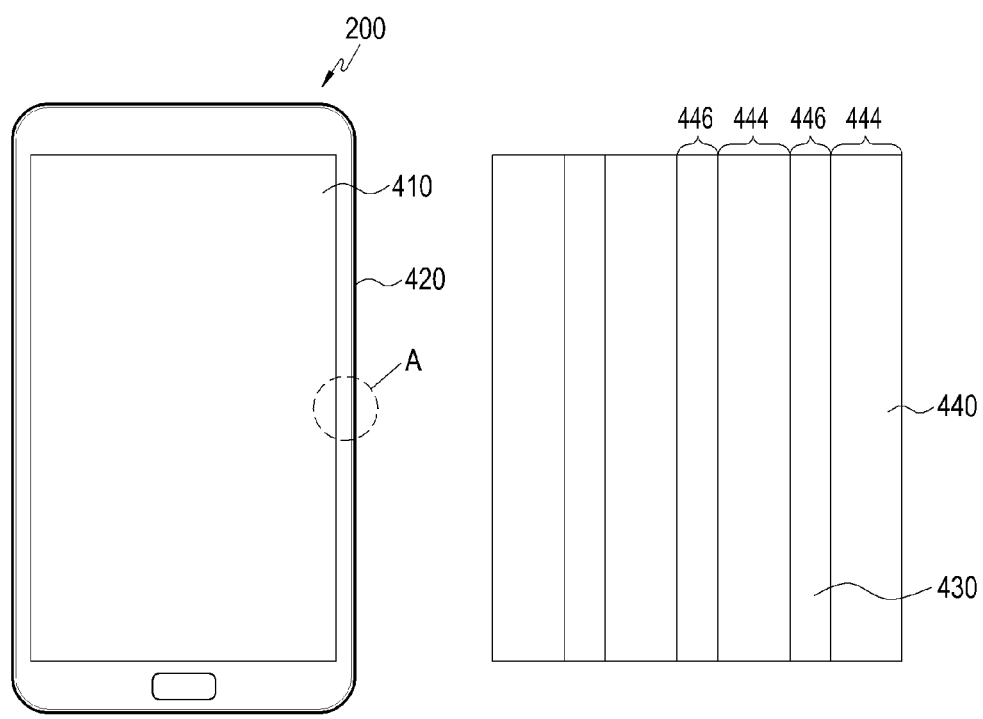
FIGS. 7A and 7B show a touch panel according to an embodiment of the present disclosure.

FIGS. 7A and 7B show a touch panel according to an embodiment of the present disclosure according to an embodiment of the present disclosure.

Referring to FIG. 7A, a front surface of the touch panel 200 is illustrated according to an embodiment of the present disclosure. When viewed by the user, the front surface of the touch panel 200 is classified into a visible area 410 located at a central portion of the touch panel 200 and a non-visible area 420 located at edges (that is, a peripheral portion of the touch panel) of the visible area 410.

a rear surface of a portion of the non-visible area 420 as shown in FIG. 7B, is illustrated by a dotted circle A in FIG. 7A according to an embodiment of the present disclosure. A light shielding layer 430 is formed on a rear surface of a window in the non-visible area 420, and a plurality of wiring electrodes 440 spaced apart from each other and are formed on a surface of the light shielding layer 430. The light shielding layer 430 may be formed through a step such as printing. A material of the light shielding layer 430 may be a screen printing ink containing a resin such as PE, acryl, or PU.

The shown wiring electrode 440 does not have a defect (an open-circuited part or a hole which does not follow a preset pattern).

Reference numeral 444 denotes a wiring area of the non-visible area 420 in which the wiring electrode 440 is disposed and reference numeral 446 denotes a non-wiring area of the non-visible area 420 in which the wiring electrode 440 is not disposed.

FIGS. 8A to 12B are views for explaining a method of manufacturing a wire of a touch panel according to an embodiment of the present disclosure.

Figure 8A:
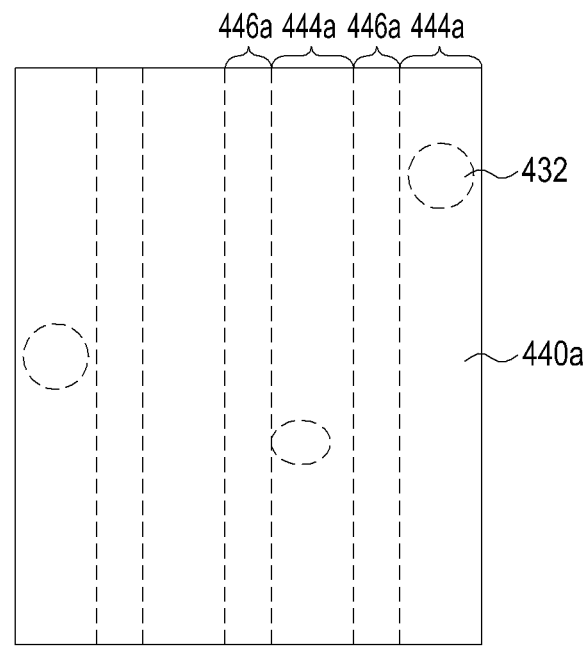
Figure 8B:
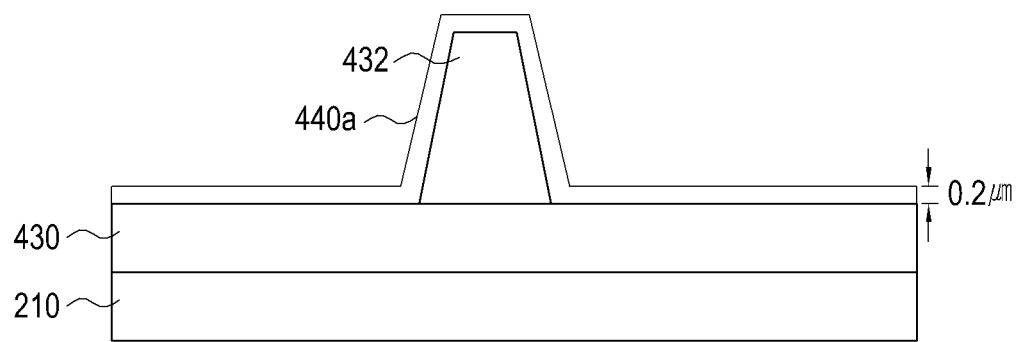

Referring to FIGS. 8A and 8B, FIG. 8A shows a rear surface of a portion of the non-visible area according to an embodiment of the present disclosure and FIG. 8B shows a side sectional view of a non-etching planned area according to an embodiment of the present disclosure.

The light shielding layer 430 for shielding visible light is formed on a rear surface of the window 210 and a conductive layer 440a is formed on a surface of the light shielding layer 430. The light shielding layer 430 may have a defect 432. The conductive layer 440 may be formed through a thin film deposition step such as PVD and CVD. The conductive layer 440a may be formed of a conductive material (or a metal) such as copper or gold.

Reference numeral 444a denotes a non-etching planned area of the conductive layer 440a and reference numeral 446a denotes an etching planned area of the conductive layer 440a. The non-etching planned area 444a is disposed to correspond to a wiring electrode.

Referring to FIGS. 9A, 9B, and 9C, FIG. 9A shows a rear surface of a portion of the non-visible area according to an embodiment of the present disclosure, FIG. 9B shows a side sectional view of the mask area according to an embodiment of the present disclosure, and FIG. 9C shows a side sectional view of the non-mask area according to an embodiment of the present disclosure.

The photoresistive mask 450 (or the photoresistive mask layer) is formed on a surface of the conductive layer 440a through a photolithography step. In the photo lithography step, the photoresistive mask 450, which acts as an etching mask, is formed by forming the liquid photoresist layer with a uniform thickness on a surface of the conductive layer 440a through a coating step (e.g., spin coating, roll coating, slit coating, and spray coating), selectively irradiating ultraviolet ray to the liquid photoresist layer to cure the liquid photoresist layer by using an optical mask having the same or similar pattern to the pattern of the wiring electrode (that is, an exposure step), and removing an uncured portion of the photoresist layer by using a developer (a development step).

The photolithography step of FIGS. 5A and 5B uses a positive photolithography of irradiating an ultraviolet ray having passed through the slits of the optical mask, which has the same or similar pattern to the pattern of the wiring electrode, to portions of the photoresist layer corresponding to gaps between wiring electrodes, and removing portions of the photoresist layer corresponding to the gaps between the wiring electrodes, which is irradiated by an ultraviolet ray.

The photolithography step of FIGS. 9A to 9C use a negative photolithography of irradiating an ultraviolet ray having passed through the slits of the optical mask, which has the same or similar pattern to the pattern of the wiring electrode, to portions of the photoresist layer corresponding to gaps between wiring electrodes, and removing portions of the photoresist layer corresponding to the wiring electrodes.

Reference numeral 456 denotes a mask area in which the photoresistive mask 450 is disposed and reference numeral 454 denotes a non-mask area in which the photoresistive mask 450 is not disposed. The photoresistive mask 450 is disposed to correspond to the gaps of the wiring electrodes.

Referring to FIGS. 10A, 10B, and 10C FIG. 10A shows a rear surface of a portion of the non-visible area according to an embodiment of the present disclosure FIG. 10B shows a side sectional area of a liftoff planned area according to an embodiment of the present disclosure, and FIG. 10C shows a side sectional view of a non-liftoff planned area according to an embodiment of the present disclosure.

An insulation layer 460a is formed on surfaces of the conductive layer 440a and the photoresistive mask 450. The insulation layer 460a has an insulating property and may be a material which is resistant to an etching solution used for wet etching, and for example, may be Silicon Dioxide (SiO$_2$) which is the same material as that of the window. The insulation layer 460a may be formed through a low temperature or low temperature vacuum deposition step at a temperature of 120 degrees or below, such as electronic beam deposition, sputtering, or the like.

Reference numeral 466a denotes a liftoff planned area of the insulation layer 460a and reference numeral 464a denotes a non-liftoff planned area of the insulation layer 460a. The non-liftoff planned area 464a is disposed to correspond to a wiring electrode.

Referring to FIGS. 11A, 11B, and 11C, FIG. 11A shows a rear surface of a portion of a non-visible area according to an embodiment of the present disclosure, FIG. 11B shows a side sectional view of a liftoff area according to an embodiment of the present disclosure, and FIG. 11C shows a side sectional view of a non-liftoff area according to an embodiment of the present disclosure.

The photoresistive mask 450 in the liftoff planned area is removed by using a stripper and a portion of the insulation layer 460a formed on a surface of the photoresistive mask 450 is removed together with the photoresistive mask 450 (that is, lifted off). According to the liftoff step, the etching mask 460 is formed.

Reference numeral 464 denotes a mask area in which the etching mask 460 is disposed and reference numeral 466 denotes a non-mask area in which the etching mask 460 is not disposed. The etching mask 460 is disposed to correspond to a wiring electrode.

Figure 12A:
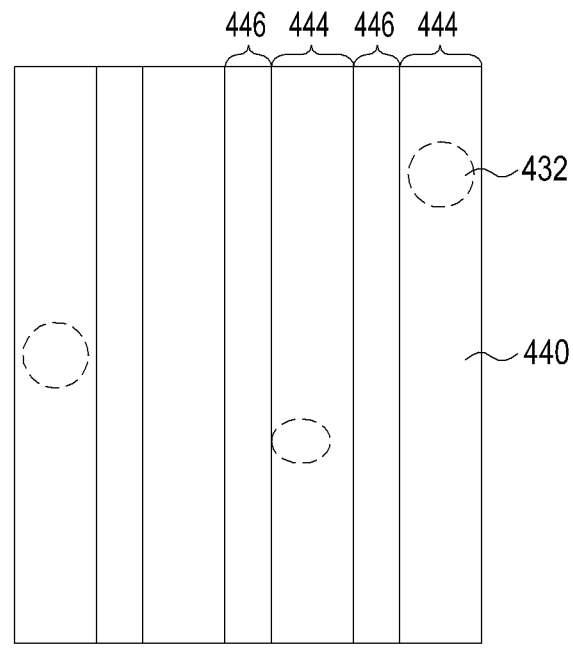
Figure 12B:
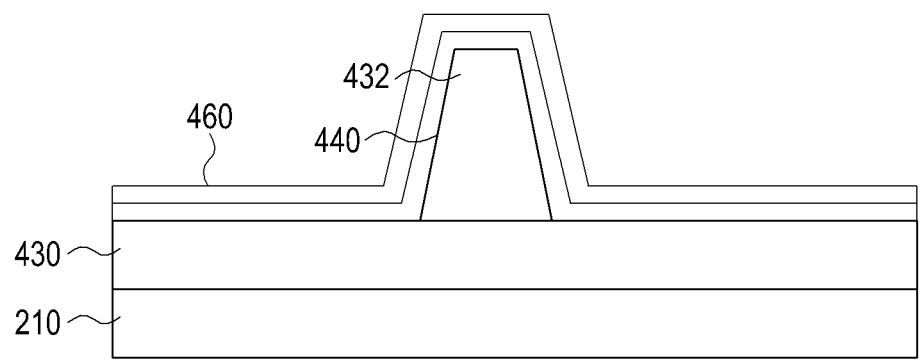

Referring to FIGS. 12A and 12B, FIG. 12A shows a rear surface of a portion of a non-visible area according to an embodiment of the present disclosure and FIG. 12B shows a side sectional view of the non-etching area according to an embodiment of the present disclosure.

The conductive layer 440a is etched by using the etching mask 460 and the etched conductive layer (that is, leftover portions of the conductive layer which are not etched) corresponds to the wiring electrodes 440. The etching mask 460 is left on a surface of the wiring electrode 440.

Etching of the conductive layer using the etching mask 460 may be realized through various etching methods such as, for example, a wet etching method.

The shown wiring electrode 440 does not have a defect (i.e., an unintended open-circuited portion or hole which does not follow a preset pattern).

Reference numeral 444 denotes a wiring area of a non-visible area in which the wiring electrode 440 is disposed and reference numeral 446 denotes a non-wiring area of the non-visible area in which the wiring electrode 440 is not disposed.

Figure 13:
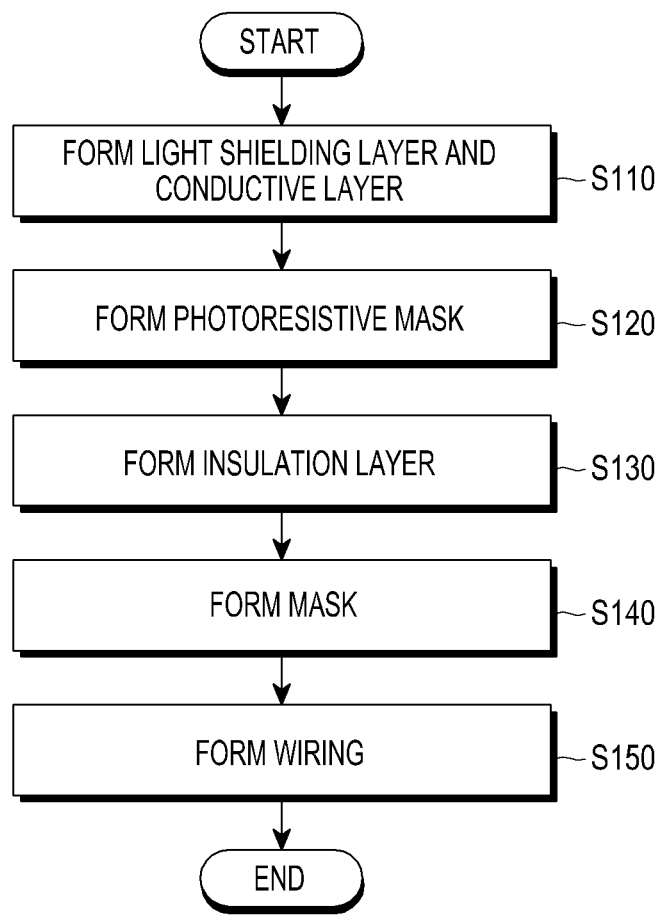
FIG. 13 is a flowchart of a method of manufacturing a wire of a touch panel according to an embodiment of the present disclosure.

FIG. 13 is a flowchart of a method of manufacturing a wire of a touch panel according to an embodiment of the present disclosure.

A method of manufacturing a wiring of the touch panel 200 includes operations S110 to S150.

In operation S110, is a light shielding layer and a conductive layer is formed. That is, the light shielding layer 430 for shielding a visual ray and the conductive layer 440a are formed on a surface of the window 210.

In operation S120, a photoresistive mask is formed on a surface of the conductive layer 440a to have a pattern corresponding to a gap pattern of a wiring electrode.

In operation S130, an insulation layer is formed on the photoresistive masks 450 and portions of the conductive layer between the photoresistive masks 450.

In operation S140, an etching mask is formed and the photoresistive masks 450 and portions of the insulation layer 460a formed on the photoresistive masks 450 are removed together by removing the photoresistive masks 450. The etching mask 460 (or a mask) is formed by the portions of the insulation layer 460a that are left without being removed through the liftoff step.

In operation S150, a wiring is formed and the conductive layer 440a is etched using the etching mask 460. Portions of the conductive layer that are left without being removed through the etching step to form the wiring electrodes 440.

Figure 14:
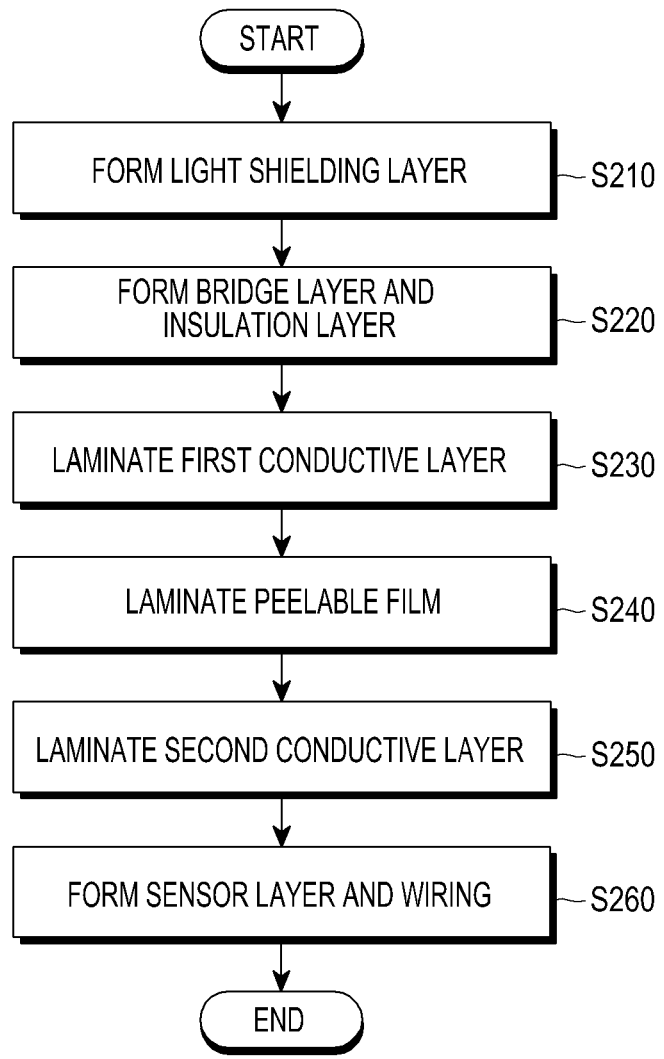
FIG. 14 is a flowchart of a method of manufacturing a touch panel according to an embodiment of the present disclosure.

FIG. 14 is a flowchart of a method of manufacturing a touch panel according to an embodiment of the present disclosure and FIGS. 15 to 23 are views for explaining the method of manufacturing a touch panel according to an embodiment of the present disclosure.

Referring to FIGS. 14, 15, 16, 17, 18, 29, 20, 21, 22, and 23, a method of manufacturing a capacitive touch panel will be exemplified but the present disclosure is not limited thereto. The method of manufacturing a wiring according to the embodiment of the present disclosure may be applied to various methods of manufacturing a touch panel, such as a resistive type touch panel, an infrared type touch panel, a surface acoustic wave type touch panel, or an electromagnetic type touch panel.

A method of manufacturing a touch panel includes operations S210 to S260.

Figure 15:
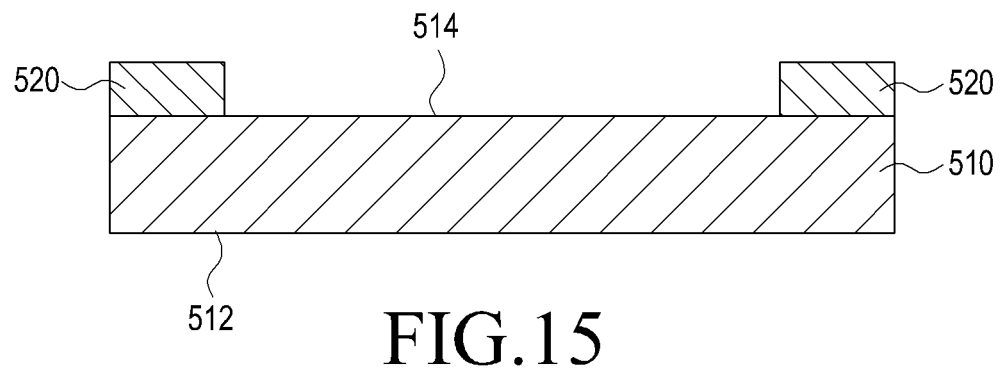
FIGS. 15, 16, 17, 18, 19, 20, 21, 22, and 23 are views for explaining the method of manufacturing a touch panel according to an embodiment of the present disclosure.

In operation S210, a light shielding layer is formed. Referring to FIG. 15, a light shielding layer 520 is formed on a non-visible area such as a peripheral or edge portion of a window 510. The light shielding layer 520 is formed at a peripheral portion of a rear surface 514 of the window 510. A front surface 512 of the window 510 forms at least a portion of the touch panel or a front surface of the touch panel exposed to the outside.

Since the front surface 512 of the window 510 is exposed to the outside, the light shielding layer 520 for shielding visible light is formed at a peripheral portion of the window 510 to prevent a peripheral portion of the touch panel from being displayed to the user.

Figure 16:
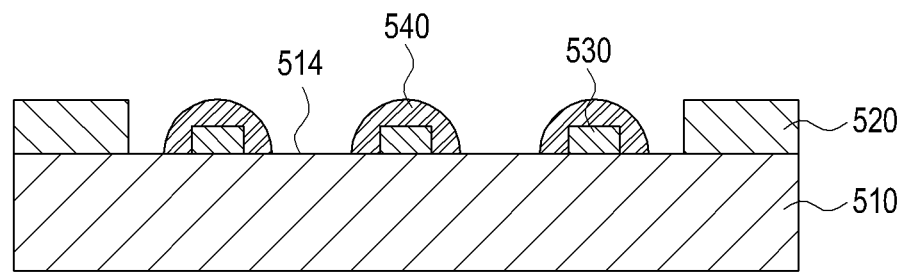

In operation S220, a bridge layer and an insulation layer is formed. Referring to FIG. 16, a bridge layer 530 and an insulation layer 540 are formed on an exposed rear surface 514 of the window 510.

In order to form the bridge layer 530, a third conductive layer is formed on the exposed rear surface 514 of the window 510 and the bridge layer 530 having a preset pattern is formed by partially (or selectively) etching the third conductive layer. The bridge layer 530 includes conductive strips located at points where first sensor patterns and second sensor patterns constituting the sensor layer cross each other.

The bridge layer 530 may be formed through patterning by a photolithography step.

In the photolithography step, a photoresistive mask having a plurality of slits may be formed by forming the photoresist, which has a uniform thickness, on an entire upper surface of the third conductive layer, partially (or selectively) irradiating an ultraviolet ray to the photoresist to cure the photoresist, and removing an uncured portion of the photoresist by using a developer. The bridge layer 530 may be formed by etching the portions of the third conductive layer exposed through the slits of the photoresistive mask to remove the portions of the third conductive layer.

The third conductive layer is formed of a conductive material, and examples of the conductive material may include Indium Tin Oxide (ITO) and poly (e.g., a 3 or 4)-ethylenedioxythiophene. The third conductive layer may be formed through a vacuum deposition step such as E-beam or sputtering.

The insulation layer 540 is formed on the bridge layer 530 by using a method such as an inkjet step using a head (or an ink dispenser) of an inkjet printer, a slit coating step, a roll coating step, or the like. In order to electrically insulate the first sensor patterns and the second sensor patterns, the insulation layer 540 includes a plurality of insulating strips, which are formed on the conductive strips in one-to-one correspondence, and the conductive strips and the insulating strips corresponding to each other cross each other (for example, in the form of a cross).

However, a non-reflecting layer may be formed on the exposed rear surface of the window 510 and the bridge layer and the insulation layer may be formed on a surface of the non-reflecting layer. The non-reflecting layer is configured such that reflection of light input to a surface thereof is minimized and layers having arbitrary materials may be configured under a condition in which high refractive index layer such as, for example, Niobium Pentoxide ($Nb_2O_5$) layers and low refractive index layers (for example, $SiO_2$ layers) are alternately formed.

Figure 17:
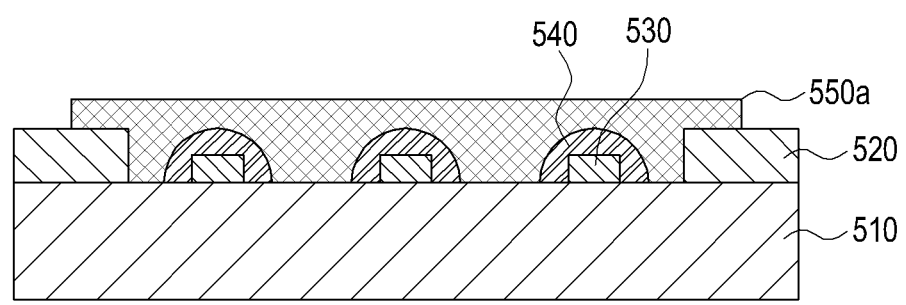

In operation S230, the first conductive layer is formed. Referring to FIG. 17, the first conductive layer 550a is formed on the exposed upper surface of the window 510, a portion of the surface of the light shielding layer 520, the bridge layer 530, and the insulation layer 540. The first conductive layer 550a may be formed through a material and a manufacturing method applicable to the third conductive layer.

Figure 18:
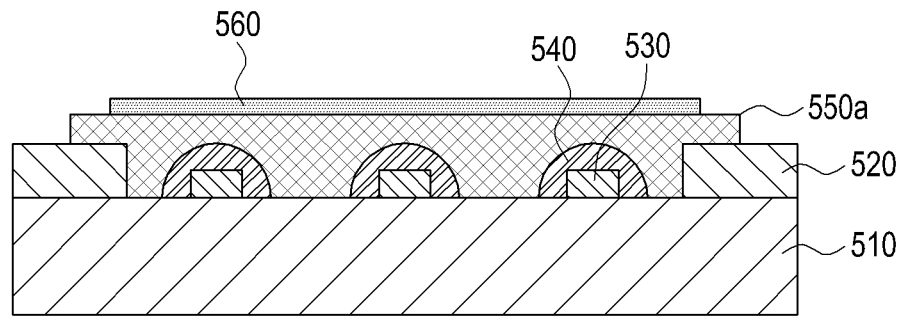

In operation S240, a peelable film is formed. Referring to FIG. 18, a peelable film 560 is attached onto the first conductive layer 550a. The peelable film 560 prevents the second conductive layer for wiring from being formed on a visible area of the touch panel.

Figure 19:
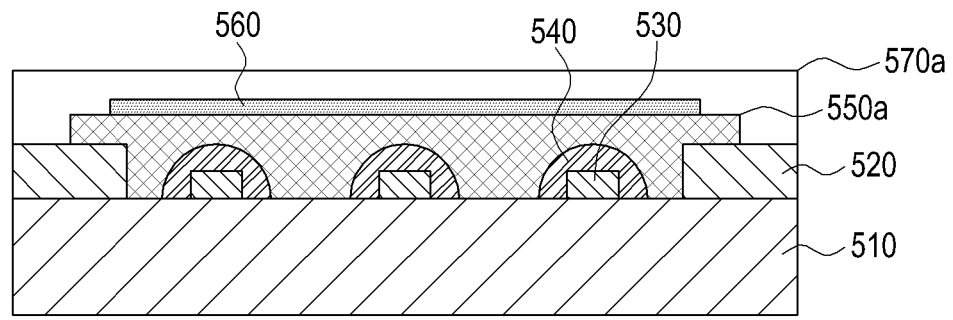

In operation S250, the second conductive layer is formed. Referring to FIG. 19, the second conductive layer 570a is formed on the exposed surface of the first conductive layer 550a, the exposed surface of the light shielding layer 520, and the peelable film 560.

Figure 20:
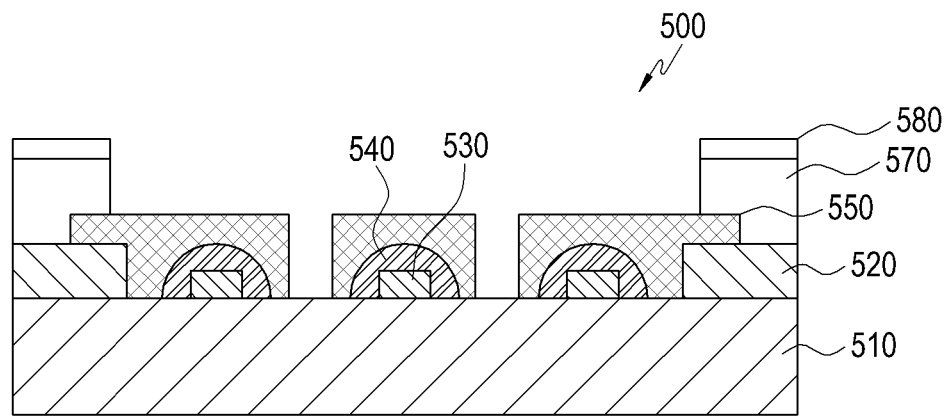

In operation S260, a sensor layer and wiring is formed. Referring to FIG. 20, the sensor layer 550 and the wiring electrode 570 having preset patterns are formed by partially (or selectively) etching the first conductive layer 550a and the second conductive layer 570a. The sensor layer 550 is electrically connected to the wiring electrode 570 by overlapping the sensor layer 550 and the wiring electrode 570 on the light shielding layer 520. The wiring electrode 570 may be formed in a method described with reference to FIG. 13 and, at the same time or sequentially, the sensor layer 550 may be formed in a method similar to that of the wiring electrode 570. According to the above-described step, the etching mask 580 may be formed only on the upper surface of the wiring electrode 570 and may not be formed on a side surface of the wiring electrode 570. The wiring electrodes 570 are spaced apart from each other to be electrically insulated from each other and the masks 580 also are independently formed on the wiring electrodes and are spaced apart from each other at the same time.

Figure 21:
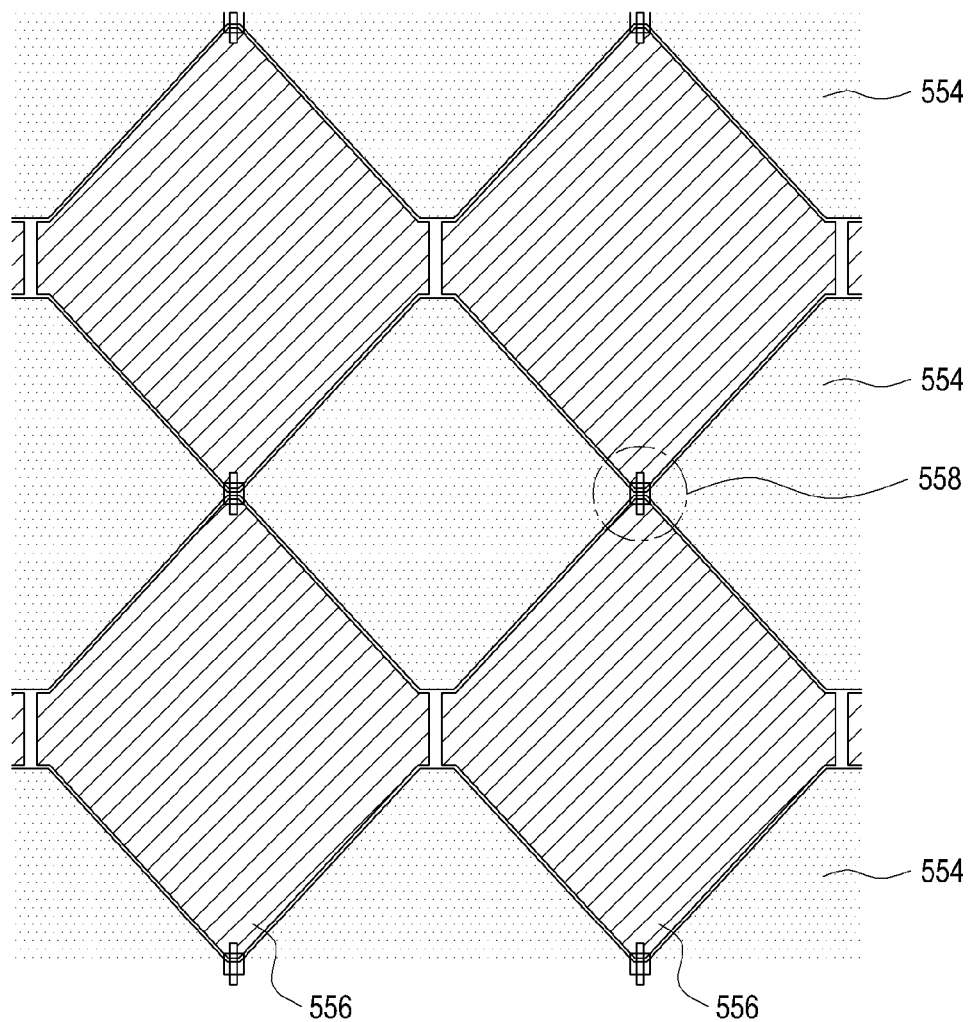
Figure 22:
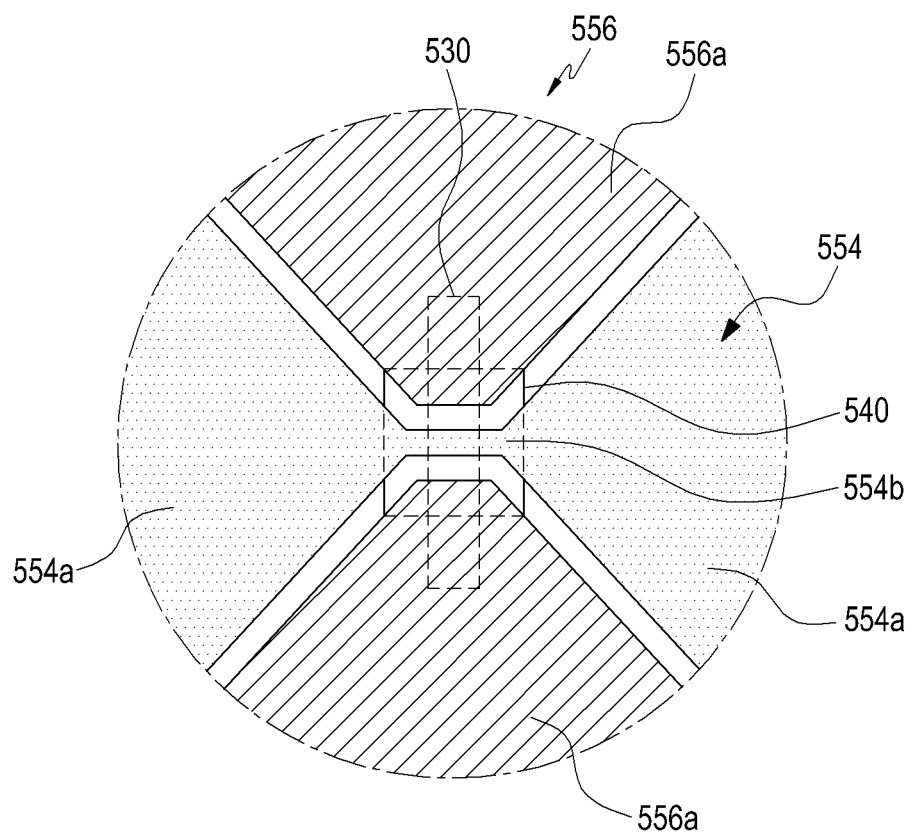

FIG. 21 is a plan view showing the sensor layer 550 and FIG. 22 is an enlarged view showing a cross part 558 of the sensor layer 550 according to an embodiment of the present disclosure.

Referring to FIGS. 21 and 22, the sensor layer 550 includes first sensor patterns 554 extending along a first direction (for example, the X axis), and second sensor patterns 556 extending along a second direction that may be perpendicular to the first direction (for example, the Y axis). The first and second sensor patterns have a conductive property.

The first sensor patterns 554 and the second sensor patterns 556 cross each other at a plurality of points on the window 510. The bridge layer 530 is configured such that the second sensor patterns 556 are electrically connected to each other without being interrupted at intersections and the insulation layer 540 is configured such that the first sensor patterns 554 and the second sensor patterns 556 are insulated from each other at the intersections. Each of the second sensor patterns 556 includes a plurality of second sections 556a separated from each other while the first sensor patterns 554 are interposed therebetween. The second sections 556a are electrically connected to each other by the conductive strips of the bridge layer 530. Each of the first sensor patterns 554 includes a plurality of first sections 554a electrically connected to each other and the connecting portions 554b between the first sections are formed on the insulating strips 540.

Figure 23:
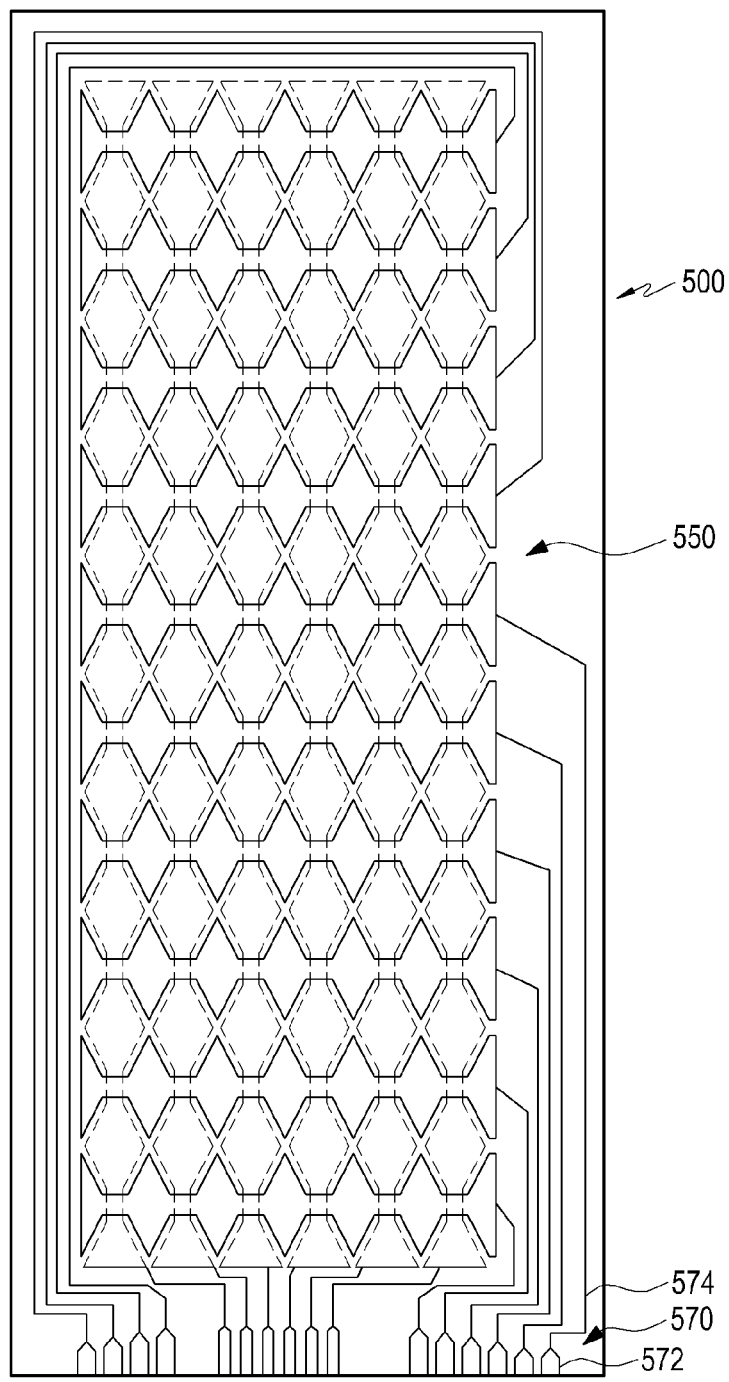

Referring to FIG. 23, a rear surface of the touch panel 500 shown in FIG. 20 is illustrated. The wiring electrodes 570 are connected to the sensor patterns of the sensor layer 550. Each of the wiring electrodes 570 may include a pad electrode 572 connected to an external connector and a line electrode 574 that connects the pad electrode 572 and a corresponding sensor pattern of the sensor layer 550.

As described above, the etching mask according to the embodiment of the present disclosure acts as a protection layer of a wiring electrode and the etching mask formed through a deposition step functions to uniformly cover a defect of a light shielding layer while acting as an etching mask at the same time.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A touch panel comprising:
   a window;
   a sensor layer formed on a visible area of the window and comprising sensor patterns for detecting an input;
   a light shielding layer formed on a non-visible area of the window located around the sensor layer;
   wiring electrodes formed directly on the light shielding layer and connected to the sensor patterns such that the sensor layer is connected to an external connector; and
   etching masks selectively and directly applied to the wiring electrodes, respectively.

2. The touch panel of claim 1,
   wherein the sensor patterns are spaced apart from each other,
   wherein the wiring electrodes are spaced apart from each other, and
   wherein the etching masks are spaced apart from each other.

3. An electronic device having a touch panel, the touch panel comprising:
   a window;
   a sensor layer formed on a visible area of the window and comprising sensor patterns for detecting an input;
   a light shielding layer formed in a non-visible area of the window located around the sensor layer;

wiring electrodes formed directly on the light shielding layer and connected to the sensor patterns such that the sensor layer is connected to an external connector; and etching masks selectively and directly applied to the wiring electrodes, respectively.

4. The electronic device of claim 3, wherein the sensor patterns are spaced apart from each other, wherein the wiring electrodes are spaced apart from each other, and wherein the etching masks are spaced apart from each other.

5. A method of manufacturing a touch panel, the method comprising:

forming a light shielding layer on a non-visible area of a window;

forming a conductive layer directly on the light shielding layer;

forming photoresistive masks directly on the conductive layer to have patterns corresponding to gap patterns of wiring electrodes;

forming an insulation layer directly on the photoresistive masks and portions of conductive layers between the photoresistive masks;

removing the photoresistive masks and portions of the insulation layer on the photoresistive masks and forming etching masks corresponding to the remaining portions of the insulation layer between the photoresistive masks; and etching a portion of the conductive layer using the etching masks and forming wiring electrodes corresponding to the remaining portion of the conductive layer, wherein the etching masks are selectively and directly applied to the wiring electrodes respectively.

6. The method of claim 5, wherein the wiring electrodes are spaced apart from each other, and wherein the etching masks are spaced apart from each other.

7. The method of claim 5, wherein the etching masks are resistant to an etching solution used in wet etching.

8. The method of claim 5, further comprising:

forming a conductive bridge layer on a visible area of the window;

forming an insulation layer crossing the conductive bridge layer;

forming a first sensor pattern connected through the bridge layer; and forming a second sensor pattern crossing the first sensor pattern while the insulation layer is interposed therebetween.

9. The method of claim 4, wherein the light shielding layer is formed through a printing process, and wherein the photoresistive masks are formed through solution coating.

\* \* \* \* \*